United States Patent
Prinz

(10) Patent No.: US 9,000,603 B2
(45) Date of Patent: Apr. 7, 2015

(54) WIND POWER PLANT AND METHOD FOR THE CONTROLLED SHUTDOWN OF A WIND POWER PLANT

(75) Inventor: Matthias Prinz, Felde (DE)

(73) Assignee: Senvion SE, Hamburg (DE)

(*) Notice: Subject to any disclaimer, the term of this patent is extended or adjusted under 35 U.S.C. 154(b) by 143 days.

(21) Appl. No.: 13/822,337

(22) PCT Filed: Aug. 31, 2011

(86) PCT No.: PCT/EP2011/065001
§ 371 (c)(1),
(2), (4) Date: Mar. 12, 2013

(87) PCT Pub. No.: WO2012/034863
PCT Pub. Date: Mar. 22, 2012

(65) Prior Publication Data
US 2013/0175799 A1    Jul. 11, 2013

(30) Foreign Application Priority Data
Sep. 16, 2010  (DE) .................. 10 2010 045 699

(51) Int. Cl.
*F03D 7/00* (2006.01)
*F03D 7/02* (2006.01)
*F03D 7/04* (2006.01)

(52) U.S. Cl.
CPC .............. *F03D 7/00* (2013.01); *F03D 7/0224* (2013.01); *F03D 7/0264* (2013.01); *F03D 7/047* (2013.01); *F05B 2270/107* (2013.01); *F05B 2270/328* (2013.01); *Y02E 10/723* (2013.01)

(58) Field of Classification Search
CPC ......... F03D 7/042; F03D 7/043; F03D 7/047; F05B 2270/1074
USPC .................... 290/44; 700/286–287
See application file for complete search history.

(56) References Cited

U.S. PATENT DOCUMENTS

| 5,779,446 | A | * | 7/1998 | Althof et al. ................. 416/36 |
| 7,231,282 | B2 | * | 6/2007 | Schubert et al. .............. 700/287 |
| 2009/0212565 | A1 | * | 8/2009 | Kabatzke et al. ............... 290/44 |

(Continued)

FOREIGN PATENT DOCUMENTS

| EP | 1860321 A2 | 11/2007 |
| EP | 2080902 A2 | 7/2009 |

(Continued)

OTHER PUBLICATIONS

International Preliminary Report on Patentability issued Mar. 19, 2013.
International Search Report dated Nov. 18, 2011.

*Primary Examiner* — Michael Zarroli
(74) *Attorney, Agent, or Firm* — Alix, Yale & Ristas, LLP

(57) ABSTRACT

A wind power plant has a main controller and a set of condition parameters that are fed to the main controller. The main controller determines settings for the operation of the wind power plant from the condition parameters. A minimal controller and a monitoring module are further provided. The minimal controller determines a setting for the pitch angle and/or pitch speed from a subset of the condition parameters. In the event of an error in the processing of the main controller, the monitoring module transfers the control over the wind power plant to the minimal controller. The wind power plant can be shut down in a controlled manner by means of the minimal controller according to the invention if an error occurs in the main controller.

20 Claims, 3 Drawing Sheets

(56) References Cited

U.S. PATENT DOCUMENTS

2010/0135801 A1 6/2010 Melius
2010/0314874 A1* 12/2010 Bluhm et al. .................. 290/44
2012/0139247 A1* 6/2012 Krueger ......................... 290/44

FOREIGN PATENT DOCUMENTS

| EP | 2211055 A1 | 7/2010 |
| JP | 60045787 A | 3/1985 |
| WO | 2009058357 A1 | 5/2009 |

* cited by examiner

WIND POWER PLANT AND METHOD FOR THE CONTROLLED SHUTDOWN OF A WIND POWER PLANT

BACKGROUND OF THE DISCLOSURE

The invention relates to a wind power plant having a main controller. A set of state variables is fed to the main controller. The main controller determines preset actuation values for the operation of the wind power plant from the state variables. The invention also relates to a method for operating such a wind power plant.

If a fault occurs in the main controller, there is the risk of incorrect preset actuation values being sent to the components of the wind power plant and of the wind power plant consequently going into an undesired state. In the event of a fault, the wind power plant can therefore no longer be operated under the control of the main controller.

Until now it has been customary to open the safety chain in the case of a fault in the main controller. On opening the safety chain, the control of the wind power plant is removed from the main controller, and the wind power plant is braked hard in an uncontrolled process. Such hard braking places the wind power plant under considerable stress. For example oscillations and abrupt load changes occur which can result in a considerably shortened service life of components of the wind power plant.

SUMMARY

The invention is based on the object of presenting a wind power plant and a method for operating such a wind power plant with which the wind power plant is stressed to a lesser degree in the event of an error in the main controller. Taking the prior art mentioned at the beginning as a starting point, the object is achieved by means of the features of the independent claims. Advantageous embodiments can be found in the dependent claims.

According to the invention, the wind power plant comprises a minimal controller and a monitoring module. The minimal controller determines preset actuation values for the pitch angle and/or the pitch speed from a partial set of state variables. The monitoring module monitors the main controller, and in the event of a fault in the execution by the main controller said monitoring module transfers the control of the wind power plant to the minimal controller.

Firstly a number of terms will be explained. The state variables contain information about conditions which can influence the operation of the wind power plant. This includes, for example, information about the state of components of the wind power plant and conditions in the surroundings, for example the wind speed. The main controller processes this information and determines preset actuation values therefrom for the operation of the wind power plant. The preset actuation values are transmitted to the respective components of the wind power plant which set their operation according to the preset actuation values. The sum of all the state variables which are fed to the main controller is referred to as a set of state variables. A partial set of state variables comprises a portion, but not all, of the state variables which belong to the set of state variables.

An instant in the main controller is then referred to as a fault if it is so serious that the wind power plant can no longer be operated under the control of the main controller. In classic wind power plants, a fault causes the safety chain to be opened and the wind power plant is braked hard. In contrast to these faults, relatively small irregularities, during which normal continued operation is possible, may occur in the main controller.

The minimal controller serves to bring the wind power plant to a standstill in a controlled operating mode. The invention has realized that the full functionality of the main controller is not necessary for this restricted task. For this reason the minimal controller includes only the state variables which it actually needs to power down the wind power plant. There are other state variables which are irrelevant for the powering down of the wind power plant. Such state variables are used only by the main controller and not by the minimal controller. As a result of the relatively small expenditure, the invention differs, in particular, from wind power plants in which the full functionality of the controller is held available repeatedly (EP 2 136 273).

The invention therefore makes available, with little expenditure in addition to that for the main controller, a minimal controller with which the wind power plant can be powered down in a protective fashion. The stressing of the wind power plant is then significantly less than if the wind power plant is braked hard after the opening of the safety chain, that is to say is brought to a standstill as quickly as possible. In contrast to hard braking, the minimal controller takes into account information about the state of the component which is influenced with the preset actuation values. A controlled operating mode therefore still takes place even with the minimal controller.

The state variables which are taken into account as a subset of state variables in the minimal controller may include, for example, the pitch angle (attitude angle of the rotor blade), the pitch speed (angular speed with which the attitude angle changes) and/or the electrical torque which is opposed to the rotor with the aid of the generator and power converter. The ability to brake the wind power plant in an orderly fashion depends directly on these state variables. Although other state variables belong to the complete set of state variables which is processed in the main controller, they do not belong to the subset of state variables of the minimal controller. These are primarily those state variables which are not directly relevant if the intention is merely to bring the wind power plant to a standstill in an orderly fashion. These can include, for example, the temperature of the gear oil or preset values from the outside relating to the voltage, reactive component, active component and other parameters relating to the feeding in of energy. For example oscillations in the plant, temperatures of components, wind direction, status of the communication devices, state of the emergency power supply etc. can also be disregarded in the minimal controller.

In order to bring the rotor of the wind power plant to a complete standstill, the rotor blades must be moved into the vane position in which they virtually no longer take up any energy from the wind. With the minimal controller it is possible to preset a pitch angle which corresponds to the vane position. The pitch speed can be reduced to zero when the respective pitch angle is reached.

Through suitable preset values for the pitch angle and the pitch speed it is possible to bring the wind power plant to a standstill irrespective of what opposing electrical torque the generator and the power converter are applying to the rotor. However, more precise control is possible if the minimal controller additionally determines preset actuation values for the electrical torque. The corresponding preset actuation values can be transmitted to the power converter. It can also be advantageous if preset actuation values for the rotor brake are determined with the minimal controller.

According to the invention it can be provided that there are variables which are relevant for the operation of the wind power plant and for which the main controller defines preset actuation values and for which the minimal controller does not define any preset actuation values since they are not needed for decelerating. These variables can include, for example, the parameters of the electrical energy which is generated. The minimal controller can therefore be configured in such a way that it does not define any direct preset actuation values for the voltage, the active component, the reactive component and/or the power. Although these values are highly relevant for the normal operating mode of the wind power plant, they are irrelevant when the aim is powering down. Of course, powering down also indirectly influences the parameters of the electrical energy which is generated.

The main controller is frequently configured in such a way that it processes state variables in a plurality of segments and determines preset actuation values therefrom. If all the segments of the main controller operate without faults, the minimal controller can be held in a sleeping state in which it does not influence the operating mode of the wind power plant. In the sleeping state, the minimal controller can also be supplied with the subset of state variables. In the case of a fault, the control can then be transferred quickly (virtually immediately) to the minimal controller. The case of a fault may be defined, for example, in such a way that such a fault occurs in one of the segments of the main controller that the main controller itself is no longer functionally capable.

In one advantageous embodiment, the minimal controller has no other purpose than to power down the wind power plant. The minimal controller can therefore be restricted to defining preset actuation values which result in a reduction in the rotor speed. At least preset actuation values which bring about an increase in the rotor speed can be excluded.

Before the wind power plant can be activated again after it has been powered down under the control of the minimal controller, the fault in the main controller should be eliminated. In order to facilitate this, the minimal controller can be configured in such a way that it stores information about the state of the main controller when a fault occurs. The information may comprise, for example, the segment of the main controller in which the fault has occurred, the type of fault, the state variables which are relevant to the segment and the preset actuation values which are determined by the segment. On the basis of this information, the service technician can selectively search for the fault. If the respective information has been transmitted to a control center which is at a distance from the wind power plant, it is possible, if appropriate, to eliminate even the need for the service technician to travel to the wind power plant.

Wind power plants are usually configured in such a way that they activate automatically from the stationary state if suitable wind conditions are present. If the wind power plant has been powered down with the minimum controller, after a fault in the main controller, automatic re-activation is frequently undesired. For this reason, the minimal controller can be configured in such a way that it prevents the automatic re-activation.

There are faults in the main controller which are overcome automatically by powering down and restarting. For this reason, it is not always appropriate to leave the wind power plant deactivated for a long period of time after the powering down by means of the minimal controller. In one advantageous embodiment, the minimal controller prevents the restarting only for a predefined time period. After the expiry of the predefined time period, the automatic re-activation can take place, provided that there is no further instruction to remain in the stationary state. The wind power plant can be re-activated at any time from the outside by control instruction.

It is possible that the fault in the wind power plant is such that it is not only the satisfactory operation of the main controller but also the satisfactory operation of the minimal controller which is adversely affected. The fault in the minimal controller can also be such that the minimal control process is no longer carried out or that a fault is detected in a component which is necessary for braking. The monitoring device can be configured in such a way that it detects such faults and opens the safety chain. The safety chain can also be opened directly by the minimal controller. A reason for opening the safety chain by means of the minimal controller may be, for example, that the system is not below a specific rotational speed within a predefined time or a specific attitude angle of the rotor blades is not reached.

The main controller and the minimal controller can be combined in one control unit. The minimal controller may be a segment in the control unit to which, in the event of a fault, priority is given over other segments of the control unit.

The invention also relates to a method for operating such a wind power plant which comprises a main controller. A plurality of state variables is fed to the main controller and the main controller determines preset actuation values for the operation of the wind power plant from the state variables. In the method, firstly a fault in the execution by the main controller is detected. After the fault, the control of the wind power plant is transferred to the minimal controller, which determines a preset actuation value for the pitch angle and/or the pitch speed from a subset of state variables. The wind power plant is braked to a stationary state under the control, and according to the preset actuation values, of the minimal controller.

In the method, information about the fault which has occurred in the main controller can be transmitted to the minimal controller. In addition, the fault information can be transmitted to a control center which is at a distance from the wind power plant. The method can be combined with further features which are described above with respect to the wind power plant according to the invention.

BRIEF DESCRIPTION OF THE DRAWINGS

The invention will be described by way of example below by means of advantageous embodiments and with reference to the appended drawings, in which.

DETAILED DESCRIPTION

Figure 1:
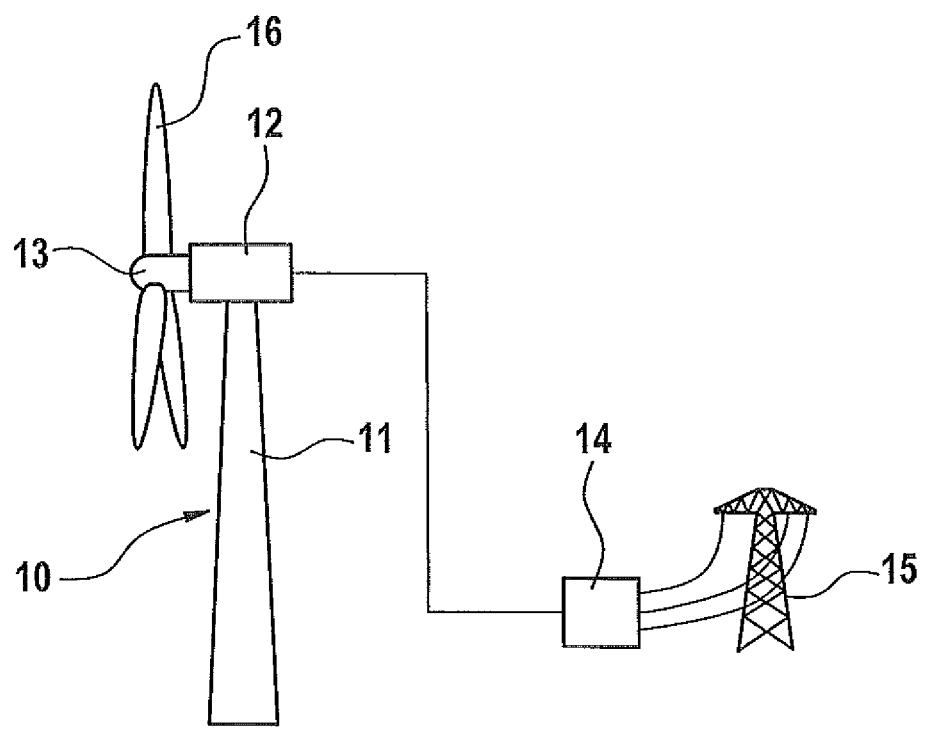
FIG. 1 shows a wind power plant according to the invention.
Figure 2:
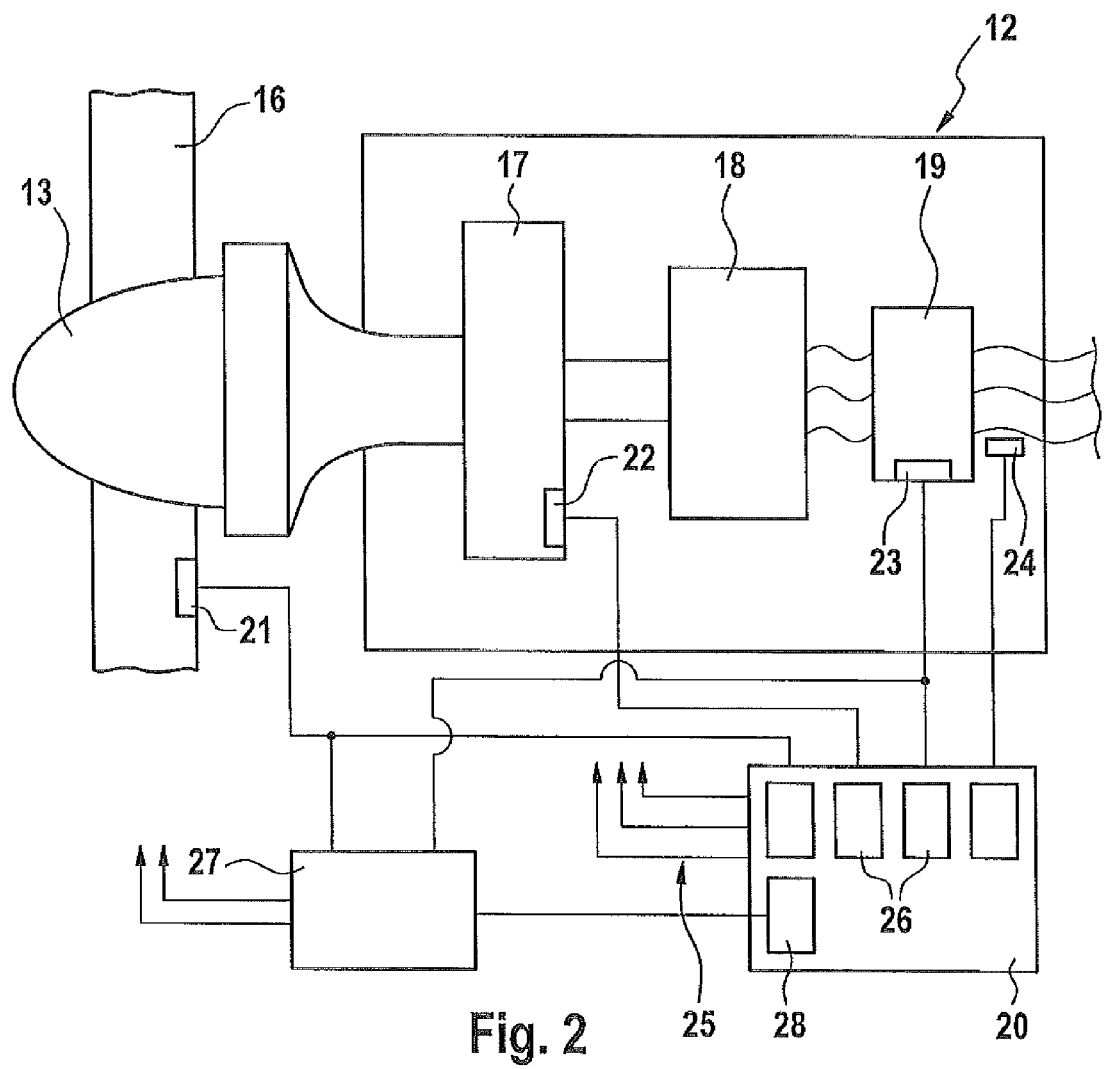
FIG. 2 shows a schematic illustration of components of the wind power plant from FIG. 1.

A wind power plant 10 in FIG. 1 comprises a machine housing 12 which is arranged on a tower 11. A rotor 13 having three rotor blades 16 is mounted in the machine housing 12, said rotor 13 being connected to a generator 18 via a gear mechanism 17 which is shown in FIG. 2. The electrical energy which is generated by the generator is directed via a power converter 19 to a transfer point 14 and transferred there to a power distribution network 15. The wind power plant 10 is usually combined with a plurality of further wind power plants to form a wind park, wherein the electrical energy from the wind power plants is combined at the transfer point 14.

According to FIG. 2, the wind power plant 10 comprises a main controller 20 to which various information items about the state of the wind power plant and/or about ambient conditions in the form of state variables are fed. Therefore, in each case a pitch controller 21 which sets the pitch angle and the pitch speed of the rotor blade 16 is arranged in the rotor blades 16. A power converter controller 23, which measures the electrical variables and correspondingly sets them, is provided in the power converter 19. The information about the actual state of the rotor blades 16 and of the power converter 19 are transmitted to the main controller 20 as state variables. There are further sensors, for example a rotational speed sensor for the rotational speed of the rotor, a brake sensor for the state of the brake or an electrical sensor 24 for parameters such as voltage, power, active component, reactive component of the generated electrical energy. Such sensors also transmit state variables to the main controller 20. FIG. 2 therefore illustrates, by way of example, a number of state variables which are taken into account in the main controller 20. The complete set of the state variables taken into account in the main controller 20 also comprises further information which FIG. 2 does not illustrate.

On the basis of these state variables, preset actuation values for the components of the wind power plant 10 are determined in the main controller 20. The output of the main controller 20 via which the preset actuation values are directed to the components of the wind power plant 10 is indicated by 25. The components of the wind power plant 10 are set according to the preset actuation values. For the determination of the preset actuation values, the main controller 20 comprises a plurality of segments 26 in which certain state variables are processed in order to determine specific preset actuation values. If the main controller 20 is embodied in form of a control program, in which a plurality of tasks are carried out in parallel, the segments 26 can correspond to the tasks of the control program.

If a fault occurs in one of the segments 26, reliable operation of the wind power plant 10 is no longer ensured. The fault can comprise the fact that the control program is no longer executed further, that is to say "is stationary". There is the risk that components of the wind power plant will receive no preset actuation values or incorrect preset actuation values, and that as a result undesired effects such as, for example, oscillations will be brought about. The wind power plant 10 can therefore no longer be operated under the control of the main controller 20. The main controller 20 contains a monitoring module 28 which continuously monitors whether such a fault occurs.

The wind power plant 10 additionally comprises a minimal controller 27 in case of a fault. The complete set of state variables which is processed in the main controller 20 is not fed to the minimal controller 27 but instead only one subset of state variables. In the exemplary embodiment in FIG. 2, the subset of state variables comprises the information from the pitch sensor 21 in the rotor blade 16 and the information from the torque sensor 23 in the power converter 19. For example the information about the temperature of the gear oil or about the parameters of the generated electrical energy does not belong to the subset of state variables.

The minimal controller 27 is configured to determine, on the basis of the subset of state variables, preset actuation values which permit orderly powering down of the wind power plant 10. The subset of state variables is sufficient for this purpose. If the wind power plant 10 is operated under the control of the minimal controller 27, it is therefore not a case of continuing the generation of electrical energy but instead of powering down the wind power plant 10 in a controlled process and of keeping the stresses caused by the braking of the rotor 13 small. In particular, the stresses are small compared to the stresses which occur during the hard braking after opening of the safety chain.

So that in the case of a fault the control of the wind power plant 10 can be transferred from the main controller 20 to the minimal controller 27, the main controller 20 comprises a monitoring module 28 with which the occurrence of a fault in the main controller 20 is continuously monitored. If the monitoring module 28 detects a fault in the main controller 20 the monitoring module 28 transfers the control of the wind power plant 10 from the main controller 20 to the minimal controller 27. The components of the wind power plant 10 then follow the preset actuation values of the minimal controller 27 and no longer the preset actuation values of the main controller 20. The minimal controller transmits torque setpoint values to the power converter 19 in order to reduce the torque according to a predefined profile. A setpoint pitch speed, with which the rotor blades 16 are to be moved in the direction of the end position, is predefined to the rotor blades 16. A pitch ramp is subsequently activated by transmitting a corresponding instruction to a pitch controller. The calculated ramp is then traveled along and the rotor blades 16 are moved into a position which can be parameterized.

Figure 3:
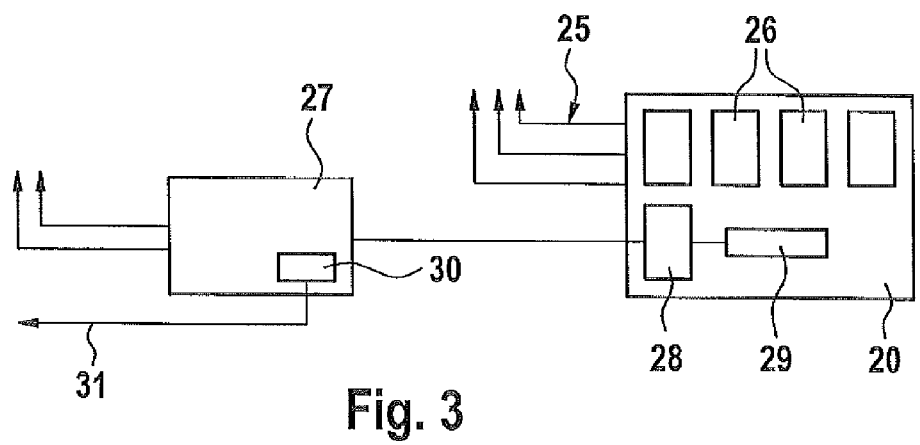
FIG. 3 shows a detail from FIG. 2 in another embodiment of the invention.

After the wind power plant 10 has been powered down under the control of the minimal controller 27, it is desirable for the normal operation of the wind power plant 10 to be resumed again as quickly as possible. As long as the fault is still present in the main controller 20, it is not possible to resume operation. The invention is intended to contribute to allowing the fault in the main controller to be eliminated quickly. According to FIG. 3, a scanner 29, which continuously reads out information about the state of the main controller 20, is provided in the main controller 20. The information can comprise, for example, the memory area or the task of the main controller 20 in which the fault has occurred, the type of fault, the state variables which are relevant for the task 26 and the preset actuation values determined by the task 26.

If the monitoring module 28 transfers control of the wind power plant 10 to the minimal controller 27 after a fault in the main controller 20, the monitoring module 28 can at the same time transmit the information from the scanner 29 to the minimal controller 27. In the minimal controller 27, the information is stored in a memory module 30, and when necessary is transmitted via a communication link 31 to a control center which is at a distance from the wind power plant 10. This makes it easier for the service technician to search for the fault in the main controller 20.

Figure 4:
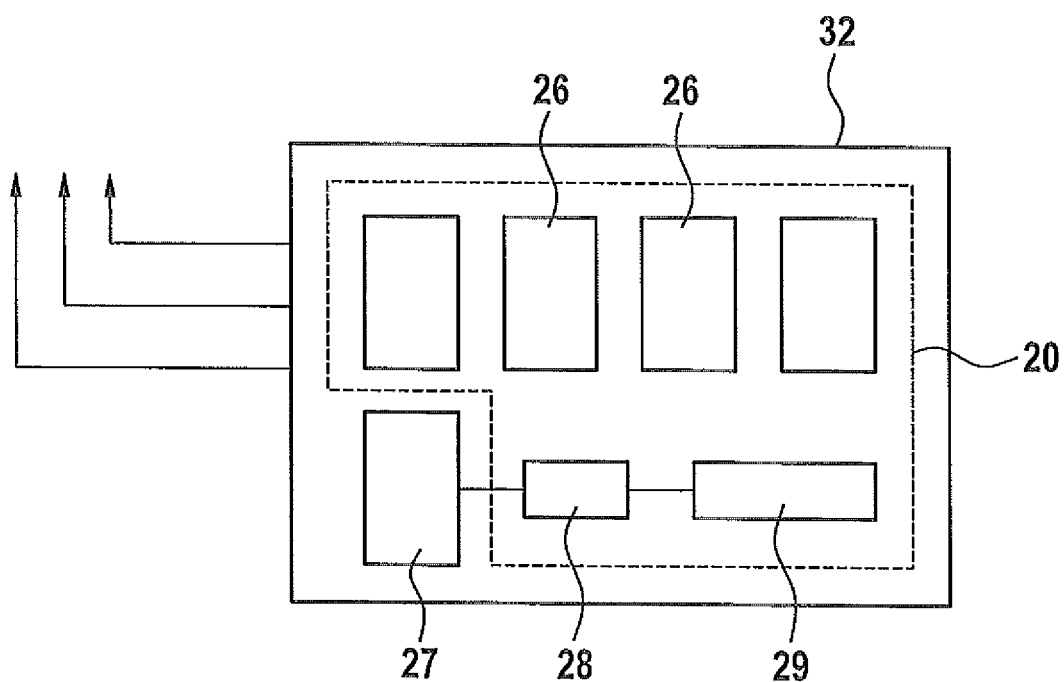
FIG. 4 shows a control unit of a power plant in another embodiment of an invention.

In the embodiment in FIG. 4, the main controller 20 and the minimal controller 37 are combined in a common control unit 32. The elements which belong to the main controller 20 are indicated by a dashed line. The minimal controller 27 is one of a plurality of segments 26 of the control unit 32. Priority over the other segments is given to the segment of the minimal controller 27 by the monitoring module 28 if the monitoring module 28 detects a fault in the main controller 20. The wind power plant 10 is then under the control of the minimal controller 27.

The invention claimed is:

1. A wind power plant having a main controller (20), to which a set of state variables is fed and which determines preset actuation values for the operation of the wind power plant (10) from the state variables, characterized in that in addition a minimal controller (27) and a monitoring module (28) are provided, wherein the minimal controller (27) determines a preset actuation value for the pitch angle and/or the pitch speed from a partial set of state variables, and wherein the monitoring module (28) monitors the main controller (20) and in the event of a fault in the execution by the main controller (20) said monitoring module (28) transfers the control of the wind power plant (10) to the minimal controller (27).

2. The wind power plant as claimed in claim 1, characterized in that the partial set of state variables comprises the pitch angle, the pitch speed and/or the electrical torque.

3. The wind power plant as claimed in claim 1, characterized in that the minimal controller (27) determines a preset actuation value for the electrical torque and/or a rotor brake.

4. The wind power plant as claimed in claim 1, characterized in that the minimal controller (27) does not determine any preset actuation values for the parameters of the generated electrical energy.

5. The wind power plant as claimed in claim 1, characterized in that the minimal controller (27) is restricted to defining such preset actuation values which result in a reduction in the rotor speed.

6. The wind power plant as claimed in claim 1, characterized in that the minimal controller (27) is configured to prevent automatic re-activation of the wind power plant.

7. The minimal controller as claimed in claim 1, characterized in that in the event of a fault in the minimal controller (27) a safety chain is opened.

8. The wind power plant as claimed in claim 1, characterized in that the minimal controller (27) is configured to store information about the state of the main controller (20) in the event of a fault occurring.

9. The wind power plant as claimed in claim 1, characterized in that the main controller and the minimal controller are combined in one control unit (32).

10. A method for operating a wind power plant, wherein the wind power plant (10) comprises a main controller (20) to which a plurality of state variables are fed and which determines preset actuation values for the operation of the wind power plant (10) from the state variables, having the following steps:

a. determination of a fault in the execution of the main controller (20);

b. transfer of the control of the wind power plant (10) to a minimal controller (27) which determines a preset actuation value for the pitch angle and/or the pitch speed from a partial set of state variables; and c. braking of the wind power plant (10) as far as a stationary state according to the preset actuation values of the minimal controller (27).

11. The method as claimed in claim 10, characterized in that information about the fault which has occurred in the main controller (20) is transmitted to the minimal controller (27).

12. The method as claimed in claim 11, characterized in that the fault information is transmitted to a control center which is at a distance from the wind power plant (10) and/or is stored in the minimal controller (27).

13. The wind power plant as claimed in claim 2, characterized in that the minimal controller (27) determines a preset actuation value for the electrical torque and/or a rotor brake.

14. The wind power plant as claimed in claim 2, characterized in that the minimal controller (27) does not determine any preset actuation values for the parameters of the generated electrical energy.

15. The wind power plant as claimed in claim 3, characterized in that the minimal controller (27) does not determine any preset actuation values for the parameters of the generated electrical energy.

16. The wind power plant as claimed in claim 2, characterized in that the minimal controller (27) is restricted to defining such preset actuation values which result in a reduction in the rotor speed.

17. The wind power plant as claimed in claim 3, characterized in that the minimal controller (27) is restricted to defining such preset actuation values which result in a reduction in the rotor speed.

18. The wind power plant as claimed in claim 4, characterized in that the minimal controller (27) is restricted to defining such preset actuation values which result in a reduction in the rotor speed.

19. The wind power plant as claimed in claim 2, characterized in that the minimal controller (27) is configured to prevent automatic re-activation of the wind power plant.

20. The wind power plant as claimed in claim 3, characterized in that the minimal controller (27) is configured to prevent automatic re-activation of the wind power plant.

* * * * *